(12) United States Patent
Srinivasan et al.

(10) Patent No.: US 9,672,435 B2
(45) Date of Patent: Jun. 6, 2017

(54) METHODS AND SYSTEMS FOR PROCESSING CHECK BASED TRANSACTIONS USING ONE TIME CODE

(71) Applicant: Xerox Corporation, Norwalk, CT (US)

(72) Inventors: Raja Srinivasan, Chennai (IN); Preethi Raj Raajaratnam, Chennai (IN); Saravanan Krishnan, Madurai (IN); Saurabh Prabhat, Webster, NY (US)

( * ) Notice: Subject to any disclaimer, the term of this patent is extended or adjusted under 35 U.S.C. 154(b) by 342 days.

(21) Appl. No.: 14/296,557

(22) Filed: Jun. 5, 2014

(65) Prior Publication Data

US 2015/0356567 A1 Dec. 10, 2015

(51) Int. Cl.
| | |
|---|---|
| *G06T 1/00* | (2006.01) |
| *G06Q 10/00* | (2012.01) |
| *G06Q 20/42* | (2012.01) |
| *G06K 9/20* | (2006.01) |
| *G06K 9/18* | (2006.01) |
| *G06Q 20/04* | (2012.01) |
| *G06Q 20/32* | (2012.01) |
| *G06Q 20/38* | (2012.01) |

(52) U.S. Cl.
CPC ............ *G06K 9/2054* (2013.01); *G06K 9/18* (2013.01); *G06Q 20/042* (2013.01); *G06Q 20/3276* (2013.01); *G06Q 20/38215* (2013.01)

(58) Field of Classification Search
None
See application file for complete search history.

(56) References Cited

U.S. PATENT DOCUMENTS

| | | | | |
|---|---|---|---|---|
| 9,047,728 | B1* | 6/2015 | Irudayam | G06Q 20/3221 |
| 2012/0024946 | A1* | 2/2012 | Tullis | G06Q 20/385 |
| | | | | 235/379 |
| 2013/0182002 | A1* | 7/2013 | Macciola | H04N 1/387 |
| | | | | 345/589 |
| 2014/0046842 | A1* | 2/2014 | Irudayam | G07F 19/202 |
| | | | | 705/43 |
| 2014/0324606 | A1* | 10/2014 | Fortuna | G06Q 50/12 |
| | | | | 705/15 |

OTHER PUBLICATIONS

Check Fraud Federal Reserve System; Federal Reserve Financial Services, pp. 1-10.

* cited by examiner

*Primary Examiner* — Robert R Niquette
*Assistant Examiner* — Joseph W King

(57) ABSTRACT

Some embodiments are directed to systems and methods for processing a check that is issued to an account holder by a bank. The method includes scanning, by a client device, at least one pre-defined machine-readable cypher that is present on the check, the check further defines at least one pattern; sending, by the client device, a service request including the scanned pre-defined machine-readable cypher to a server device; receiving, at the client device, a code that is tailored to the check based on an authentication of the service request from the server device, the code is machine-readable and includes at alphabet(s), a numeral(s), and/or a symbol(s); and changing the appearance, by the account holder, of the pattern on the check based on the received code.

26 Claims, 11 Drawing Sheets

METHODS AND SYSTEMS FOR PROCESSING CHECK BASED TRANSACTIONS USING ONE TIME CODE

TECHNICAL FIELD

The presently disclosed embodiments relate to processing check based banking transactions, and more particularly to methods and systems for processing such transactions using a one-time usable code.

BACKGROUND

Banks continue to play a significant role in many financial transactions, such as by managing the financial transactions of individuals and organizations. Each banking organization, which may include one or more separate facilities, can provide users with the ability to open an account, deposit money in the account, withdraw money, transfer money, perform online banking, and so forth. The user can perform various kinds of money transactions, for example, transferring money in some other account, issuing a check, opening a fixed deposit account, etc., via his/her account in the bank.

SUMMARY

Some of these banking transactions involve checks, where an account holder signs a personalized check and initiates a transaction with a third party. The bank, which issued the check to the account holder and where the account holder holds the account, may authorize the transaction after verifying the signature on the check against their records.

However, the dependency of such transactions, and in some cases crucial business transactions, on this type of signature authorization, such as manual verification, suffers from inaccuracies and/or is vulnerable to external attacks. For example, the signatures may not be exactly replicated every time, and there is a tolerance involved during signature validation. Further, signatures can be easily tampered with and spoof detection is a time-consuming process. In addition, the signatures tend to change over time, thereby requiring the customer to update his/her bank records with updated signatures to enable his/her future transactions to be authorized. Further, because validation of signatures is a manual process, detection of signature spoofing is time-consuming and difficult to accomplish within certain time constraints.

It may therefore be beneficial to provide systems and methods that facilitate secure check transaction management, such as methods and apparatus that address one or more of the above issues.

An embodiment is a system for processing a check that is issued to an account holder by a bank. The method includes scanning, by a client device, at least one pre-defined machine-readable cypher that is present on the check. The at least one pre-defined machine-readable cypher being a machine-readable representation including at least one of an image, a bar code, an alphabet, a numeral, and a symbol, the check further defines at least one pattern. The pattern may include a number of characters such as, alphabets, numerals, symbols, and combination thereof. The characters in the pattern may remain regularly spaced by vertical and/or horizontal lines. Further, the pattern may be two dimensional i.e. the pattern may include two rows and two columns including characters. The method also includes sending, by the client device, a service request including the scanned at least one pre-defined machine-readable cypher to a server device. The method further includes receiving, at the client device, at least one code that is tailored to the check based on an authentication of the service request including the scanned at least one pre-defined machine-readable cypher from the server device. The at least one code is machine-readable and includes at least one of an alphabet, a numeral, and a symbol. The method also includes changing the appearance, by the account holder of the at least one pattern on the check based on the received at least one code.

Another embodiment of the present disclosure provides a client device for processing a check that is issued to an account holder by a bank. The client device is for use with a server device. The system includes a first scanning module configured to scan at least one pre-defined machine-readable cypher that is present on the check. The at least one pre-defined machine-readable cypher being a representation including at least one of an image, a bar code, a QR code, an alphabet, a numeral, a symbol, and/or combination of thereof. The check further includes or defines at least one pattern. The pattern may include a number of characters such as, alphabets, numerals, symbols, and combination thereof. The characters in the pattern may remain regularly spaced by vertical and/or horizontal lines. Further, the pattern may be two dimensional, i.e., the pattern may include two rows and two columns including characters. The client device also includes a first transceiving module configured to send a service request including the scanned at least one pre-defined machine-readable cypher to the server device and to receive at least one code that is tailored to the check based on an authentication of the service request including the scanned at least one pre-defined machine-readable cypher from the server device. The at least one code includes at least one of an alphabet, a numeral, and a symbol. The code is configured to enable the account holder to change the appearance of the at least one pattern on the check based on the at least one code received at the first transceiving module.

A further embodiment of the present disclosure provides a method for processing a check that is issued to an account holder by a bank. The method includes scanning by a first scanning module of a client device, the check including at least one pre-defined machine-readable cypher and at least one pattern, the at least one pre-defined machine-readable cypher being a representation including at least one of an image, a bar code, a QR code, an alphabet, a numeral, a symbol, and/or combination thereof. The at least one pattern may include a number of characters such as, alphabets, numerals, symbols, and combination thereof. The characters in the pattern may remain regularly spaced by vertical and/or horizontal lines. Further, the pattern may be two dimensional i.e. the pattern may include two rows and two columns including characters. The method also includes sending, by a first transceiving module of the client device, a service request including the at least one pre-defined machine-readable cypher to a server device. The method further includes receiving, by the first transceiving module, at least one code based on an authentication of the scanned at least one pre-defined machine-readable cypher from the server device. The at least one code includes at least one of an alphabet, a numeral, a symbol, and/or a combination thereof. The method also includes mapping, by a code mapping module of the client device, the at least one code to a string, the string includes at least one of alphabets, numerals, and symbols. A first database stores one or more codes and at least one string for each of the one or more codes. The method also includes changing the appearance, by the account holder, of the at least one pattern on the check based on the string. The string is usable only once for highlighting the at least one pattern.

A still another embodiment of the present disclosure provides a client device for use with a server device for processing a check that is issued to an account holder by a bank. The client device includes a first database configured to store one or more codes and at least one string corresponding to each of the one or more codes. The client device also includes a first scanning module configured to scan the check including at least one pre-defined machine-readable cypher and at least one pattern, the at least one pre-defined machine-readable cypher being a representation including at least one of an image, a bar code, an alphabet, a QR code, a numeral, and a symbol. The at least one pattern may include a number of characters such as, alphabets, numerals, symbols, and combination thereof. The characters in the pattern may remain regularly spaced by vertical and/or horizontal lines. Further, the pattern may be two dimensional, i.e., the pattern may include two rows and two columns including characters. The client device also includes a first transceiving module is configured to send a service request including the scanned at least one pre-defined machine-readable cypher to the server device; and receive at least one code based on an authentication of the scanned at least one pre-defined machine-readable cypher from the server device. The client device also includes a code mapping module configured to map the at least one code to a string. The string includes at least one of alphabets, numerals, and symbols. The string is configured to enable the account holder to change the appearance of the at least one pattern on the check based on the string by shading the pattern. The string may be usable only once for highlighting/shading the pattern on the check.

A yet another embodiment of the present disclosure provides a method for processing a check that is issued to an account holder by a bank. The method includes scanning, by a first scanning module of a client device, the check includes at least one pre-defined machine-readable cypher and a two dimensional pattern. The at least one pre-defined machine-readable cypher being a representation including at least one of an image, a bar code, an alphabet, a numeral, and a symbol. The two dimensional pattern includes a plurality of alphabets, symbols, and/or numerals. The method also includes generating, by a code mapping module of the client device, at least one encrypted code corresponding to the pre-defined machine-readable cypher, the encrypted code includes at least one of alphabets, numerals, and symbols, wherein a first database stores one or more pre-defined codes and associated encrypted code. The method further includes sending, by a first transceiving module of the client device, a service request including the at least one encrypted code to a server device. The method also includes receiving, by the first transceiving module, at least one code based on an authentication of the at least one encrypted code from the server device. The at least one code includes at least one of an alphabet, a numeral, and a symbol. The method also includes changing the appearance, by the account holder, of the two dimensional pattern on the check based on the at least one code, and the at least one code is usable only once for highlighting the two dimensional pattern.

A further embodiment is a client device for use with a server device for processing a check that is issued to an account holder by a bank. The client device includes a first database configured to store one or more pre-defined machine-readable cyphers and associated encrypted codes. The client device further includes a first scanning module configured to scan the check including at least one pre-defined machine-readable cypher and a two dimensional pattern. The at least one pre-defined machine-readable cypher being a representation including at least one of an image, a bar code, an alphabet, a numeral, a QR code, and a symbol. The pattern may include a number of characters such as, alphabets, numerals, symbols, and combination thereof. The characters in the pattern may remain regularly spaced by vertical and/or horizontal lines. Further, the two dimensional pattern may include two rows and two columns of characters. The client device further includes a code mapping module configured to generate an encrypted code based on the pre-defined machine-readable cypher. The encrypted code is a unique code, which is generated in real-time corresponding to the pre-defined machine-readable cypher. The client device further includes a first transceiving module configured to send a service request including the encrypted code to a server device; and receive at least one code based on an authentication of the encrypted code from the server device. The at least one code is configured to enable the account holder to change the appearance of the two dimensional pattern on the check based on the at least one code. Further, the at least one code is usable only once for highlighting the two dimensional pattern.

DETAILED DESCRIPTION

Figure 1A:
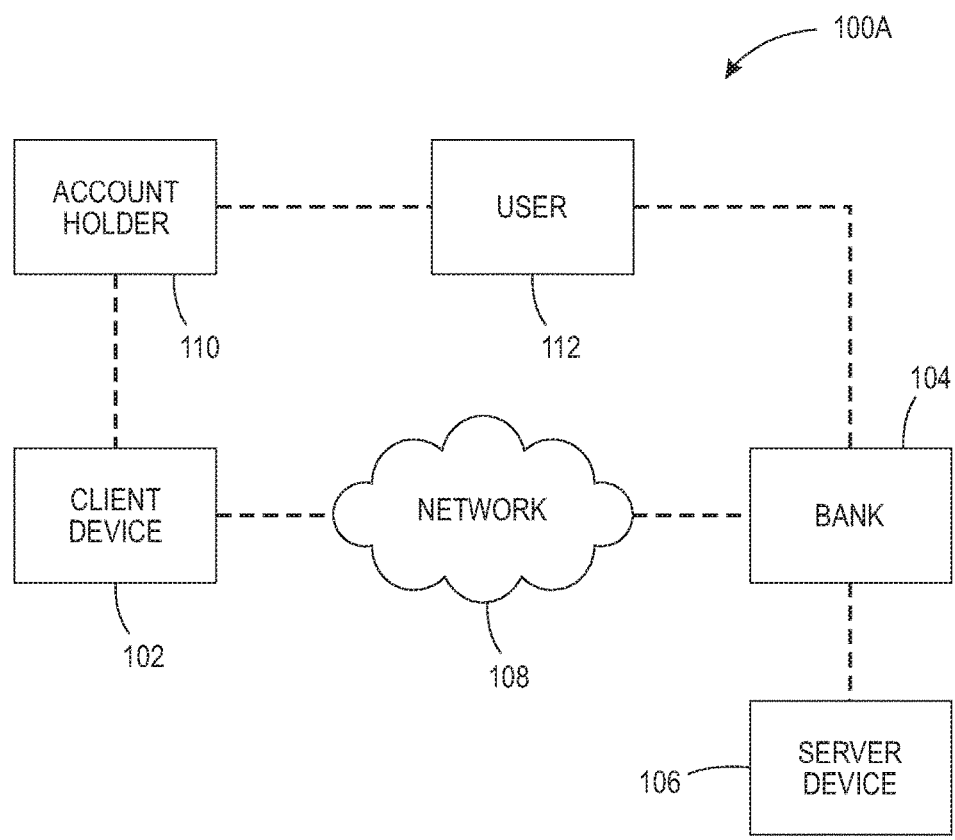
FIG. 1A is a schematic that illustrates an exemplary overall system, in accordance with an embodiment of the present disclosure.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

DEFINITIONS

Definitions of one or more terms that are used in this disclosure are provided below. The term, "check" refers to a document or a written order that instructs a bank to pay upon its presentation to the person designated in it, or to the person possessing it, a certain sum of money from an account of the person who draws it. The term "pattern" refers to a two dimensional pattern including one or more characters, the characters may be alphabets, numerals, and symbols that may remain spaced apart by vertical and/or horizontal lines. The term "account" refers to a virtual or physical space that a bank provides to any person for storing and transacting money. The term "account holder(s)" refers to any individual or entity that maintains an account with a bank. The term "check transaction" refers to any activity related to issuing a check to a user by an account holder having an account in a bank. The account holder can use and access one or more facilities as provided by the bank. The term "checkbook" refers to a booklet including multiple checks. The bank issues the checkbook to the account holder. Further, the account holder can issue one or more checks from the checkbook to the user.

The term "client device" refers to any suitable computing device capable of connecting to a network, such as the Internet, and communicating with a server device. Examples of the client device may include, but are not limited to, a mobile phone, a desktop computer, a tablet computer, and so forth. Further, the term "server device" refers to a device or a group of devices or software modules capable of receiving and processing one or more request from the client devices present in the network.

The client and server devices are intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Further, the term "MFD" as used herein includes a single device that offers a number of traditionally separate functionalities, such as printing, copying, scanning, and faxing. Further, "mobile device" refers to any device that has a wireless connection with a network or components related to the network. "Mobile device" can also be a landline telephone as long as it can communicate with the MFD remotely. The present disclosure includes mobile users, such as cell phones, Smartphones, PDAs, and so on. Moreover, an "address" is any identifying information that allows a device to be accessed on a network, such as an IP address or URL, the URL including both long form (including full protocol information, such as "http://") or short form, beginning with "www" or only a website name, such as "foobar.com". An "access code" is an identifier capable of designating a specific device, such as an MFD, on a computer network or local computer system. A "telephone number" is an identifier capable of identifying a device or location on a telephone network of any type, including traditional voice networks, packet-oriented data telephone networks, voice-over-IP networks, or other telephone networks now in service or hereafter developed.

As used herein, the term "pre-defined machine-readable cypher" refers to a machine-readable unique representation present on the check. The pre-defined machine-readable cypher may include an image, an alphabet, a bar code, a numeral, a symbol, a QR code, and combination of these. The term "code" refers to a unique code generated by the server device after authentication of the pre-defined machine-readable cypher received from a client device associated with an account holder. The code may be a one-time usable code and may include a number of alphabets, numerals, symbols, and combination of these.

As used herein, the term "encrypted code" refers to a unique code, which is generated by the client device in real-time corresponding to the pre-defined machine-readable cypher. Further, the encrypted code can be a combination of alphabets, symbols, numerals, and so forth. As used herein, the term "string" refers to a sequence of characters having at least one of alphabets, numerals, symbols, and combination of these.

Overview

Some disclosed embodiments generally relate to systems and methods that facilitate trusted and secure check transactions between one or more parties via a secure check management system. The one or more parties include account holders, users, banks, etc. To this end, the disclosure provides a secure check management system that includes a client device for sending one or more requests to a server device via a network.

Some embodiments of the present disclosure address one of the major forms of check fraud, i.e., forging of signatures, by introducing the concept of one-time signatures to replace or augment personal signatures on checks in a secured manner. In accordance with some of these embodiments, a machine readable unique pre-defined machine-readable cypher, such as a bar code, QR code (Quick Response code), etc., or any other type of known, related art, or later developed cypher, and a pattern, such as a two dimensional pattern, are printed in checks provided by banks. The pattern may include a number of characters such as, alphabets, numerals, symbols, and combination thereof. The characters in the pattern may remain regularly spaced by vertical and/or horizontal lines. Further, the pattern may be two dimensional i.e. the pattern may include two rows and two columns including characters. Further, account holders can scan or otherwise read the pre-defined machine-readable cypher, such as by using a mobile application running on a client device, which can be a smart phone. The client device securely transmits this unique pre-defined machine-readable cypher to a server device of the bank. The server device may perform user authentication by validating the incoming request against the customer's registered client device, such as by any known, related art or later developed technique. On successful authentication, the server device responds with a one-time signature or code that can be a random sequence of characters, including but not limited to symbols, alphabets, numerals, and so forth. The client device may receive the code using any known, related art or later developed technique, including but not limited to short message service (SMS) from the server device. The account holder may then annotate or otherwise affect the appearance or other aspects of the pattern, such as by shading out corresponding characters on the two dimensional pattern, based on the received code. The account holder then may initiate a check transaction by tendering the highlighted or shaded check to a third party, such as another user who is the recipient of payment.

Further, the combination of the pre-defined machine-readable cypher and the one-time code is stored in the server device to automatically validate and authorize the check transaction. These disclosed embodiments thereby address some of the disadvantages of the manual signature verification process involved in check transactions that are disclosed above. Further, the disclosed systems and methods provide enhanced security in the check transactions. In addition, the disclosed systems and methods automate the verification of checks and the associated check transactions during processing of the checks, such as at banks.

Check transactions involve authenticating the identities of the sending and the receiving parties, and verifying the check(s) being transacted. The disclosed methods and systems for processing check and associated check transactions secure, enhance, and/or optimize the banking transaction workflow and reduce or eliminate the need for manual verification of checks. The proposed systems and methods include generation of one-time codes or signatures that augment personal signatures, which may be beneficial because signatures suffer from inherent inaccuracies, i.e., signatures are not perfectly consistent and individuals are unable to replicate signatures over time with a high degree of precision. In addition, personal signatures can be easily duplicated, and verification is mainly performed manually.

Some of the disclosed methods involve two major steps for a customer or account holder to authorize a check transaction from his/her end. When an account holder wants to issue a check, he/she scans or otherwise captures the unique representation that is a pre-defined machine-readable cypher printed on the check. A secure check-managing module or application running at a client device enables the account holder to scan or otherwise capture the pre-defined machine-readable cypher. Further, the secure check-managing module communicates the unique pre-defined machine-readable cypher to a bank server device in a secure manner.

At the bank end, the server device may authenticate the request by validating the incoming request against the account holder's registered client ID of the client device. Once authenticated, the server device may respond with a unique code or signature to the registered client device. This code is used by the account holder either directly or using a conversion based on a private pattern card (which is described in further detail in subsequent figures), to annotate or otherwise affect the appearance of the pattern, such as by shading out a two dimensional pattern on the check to authorize the check.

The check is then given to a third party as payment. When any check arrives at the bank for verification, the check is scanned by an MFD and using standard imaging techniques, such as Annotation lifting in XIPS, the filled out characters are extracted. The extracted characters are then matched against the combination of pre-defined machine-readable cyphers and the codes stored in bank database or record to authorize the check transaction accordingly.

In addition, some embodiments enable the check amount to be scanned or otherwise captured, and then transmitted to the bank. This transmission can occur at any relevant time, such as when the cypher is transmitted to the bank. Upon receipt, the bank can perform any beneficial procedure, such as comparing the amount of the check with the available funds of the customer. In these embodiments, the bank can refuse to authenticate or verify the cypher if the check amount exceeds the available funds. However, other procedures can be performed, such refusing to authenticate or verify the cypher if the check amount exceeds a certain amount limit or violates some other security protocol, even if the funds are available.

Overall Exemplary System

FIG. 1A is a schematic that illustrates an overall exemplary system 100A in which various of the disclosed embodiments may be practiced. The system 100A may be a secure check transaction management system that includes a client device 102, which is configured to communicate with a server device 106 associated with a bank 104. The client device 102 can communicate and exchange information with the server device 106 via a network 108. The network 108 can be the Internet, Local Area Network (LAN), and so forth.

The client device 102 is associated with an account holder 110, and is registered with the bank 104. Further, the client device 102 may register with the bank using a client identity such as a mobile phone number. One or more individuals and one or more business(es)/organization(s) (hereinafter, collectively referred as at least one account holder 110) may have at least one account with the bank 104. The at least one account holder 110 of the bank 104 may interact with the bank 104 to perform various types of bank transactions. Various example of bank transactions may include, but are not limited to, opening a new document account, depositing money in the account, requesting a service, requesting a check book, depositing a check, receiving money from another account, and so forth. Examples of the at least one account may include, but not limited to, a saving account, a current account, a fixed deposit account, and so forth. The bank 104 can issue at least one checkbook including one or more checks to its various account holders, such as the account holder 110. Each of the checks may include a pre-defined machine-readable cypher and at least one pattern. The pattern may include a number of characters such as, alphabets, numerals, symbols, and combination thereof. The characters in the pattern may remain regularly spaced by vertical and/or horizontal lines. Further, the pattern may be two dimensional i.e. the pattern may include two rows and two columns including characters.

When the account holder 110 wishes to issue a check of the checkbook to a third party such as a user 112, he/she may scan a pre-defined machine-readable cypher printed on the check using the client device 102. In an embodiment, the client device 102 may include a secure check management module for scanning the pre-defined machine-readable cypher. The pre-defined machine-readable cypher may include an image, an alphabet, a bar code, a QR code, a numeral, a symbol, and combination thereof. The client device 102 then may send a service request for requesting a one-time code or signature to the server device 106. The service request may include the scanned pre-defined machine-readable cypher. In an embodiment, the client device 102 converts the pre-defined machine-readable cypher into an encrypted code and sends this encrypted code to the server device 106. Further, the encrypted code can be a combination of alphabets, symbols, numerals, image, bar code, QR code, and so forth.

The server device 106 is configured to authenticate the account holder 110 and/or the client device 102 based on the received pre-defined machine-readable cypher. Post authentication, the server device 106 may send a code or signature to the client device. The code or signature is usable only one time for shading the pattern, and may remain valid for a fixed time of duration. Further, the code or signature may be unique code generated by the server device 106 after authentication of the pre-defined machine-readable cypher received from the client device 102 associated with the account holder 110. The code/signature may include a number of alphabets, numerals, symbols, and combination of these. Hereinafter, the code or signature may be referred as one-time code or one-time signature.

At the client device 102, the account holder 110 may shade out a portion of the at least one pattern in the check based on the received one-time code. In some embodiments, the client device 102 may generate or select a string corresponding to the received one time code. In alternative embodiments, the account holder 110 may manually select the string from a private pattern card assigned to the account holder 110. The string may be one time usable for shading out the pattern. The string may be a sequence of characters having at least one of alphabets, numerals, symbols, and combination of these.

The account holder 110 may provide this highlighted check to the user 112 for initiating a check transaction. The user 112 may deposit this highlighted check at the bank 104 or an associated branch of the bank 104. On arrival of check at the bank 104, the server device 106 may process it further for clearance as described in detail with reference to subsequent figures.

Figure 1B:
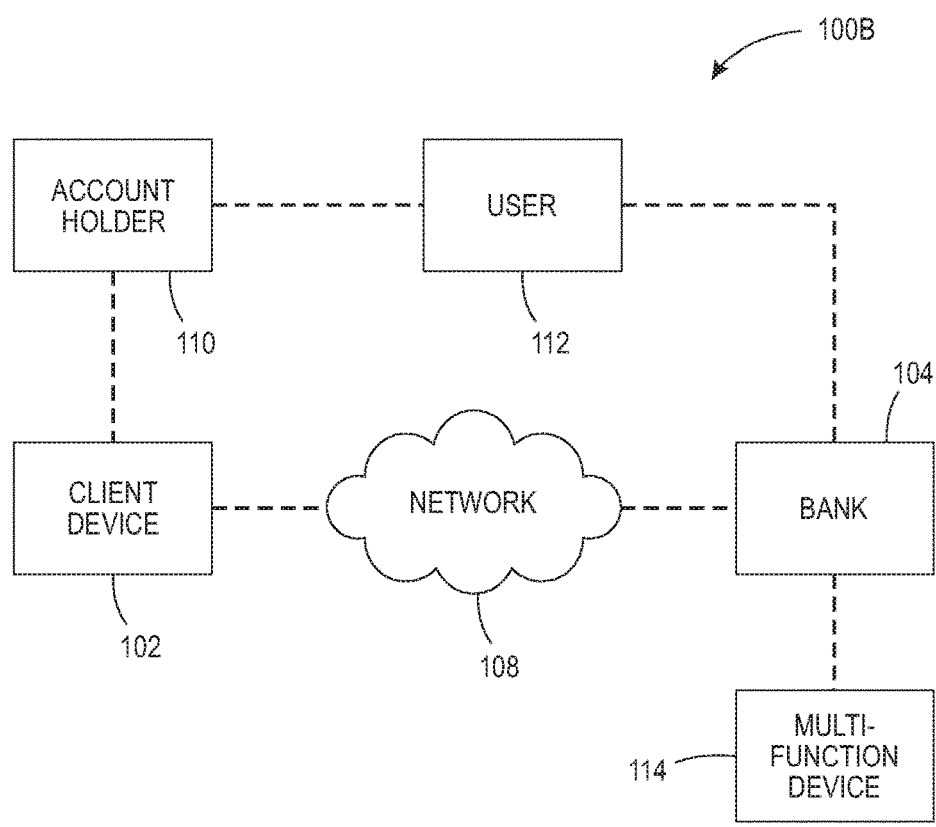
FIG. 1B is a schematic that illustrates another exemplary overall system, in accordance with another embodiment of the present disclosure.

As shown in FIG. 1B, the server device 106 may be an MFD 114 in a system 100B. Various modules or system elements of the server device 106 are described in further detail in subsequent FIG. 3. In this embodiment, the MFD 114 processes the check further.

Figure 2A:
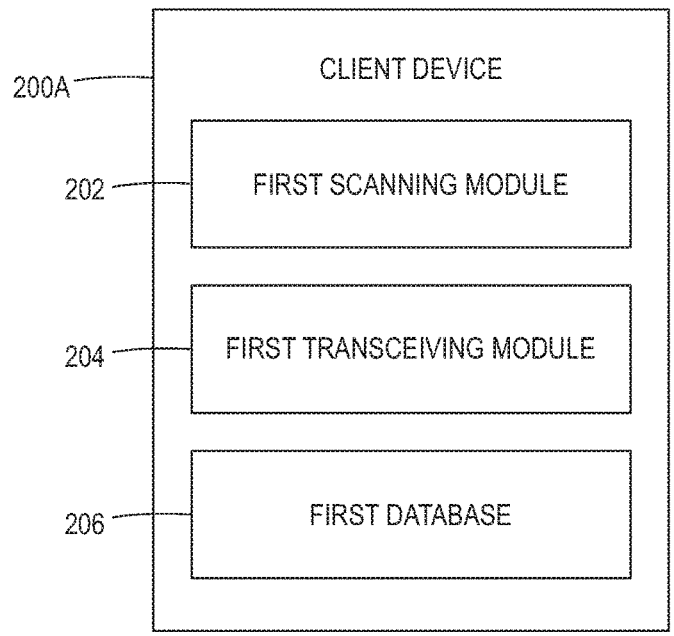
FIG. 2A is a schematic that illustrates system elements of a client device, in accordance with an embodiment of the present disclosure.
Figure 2B:
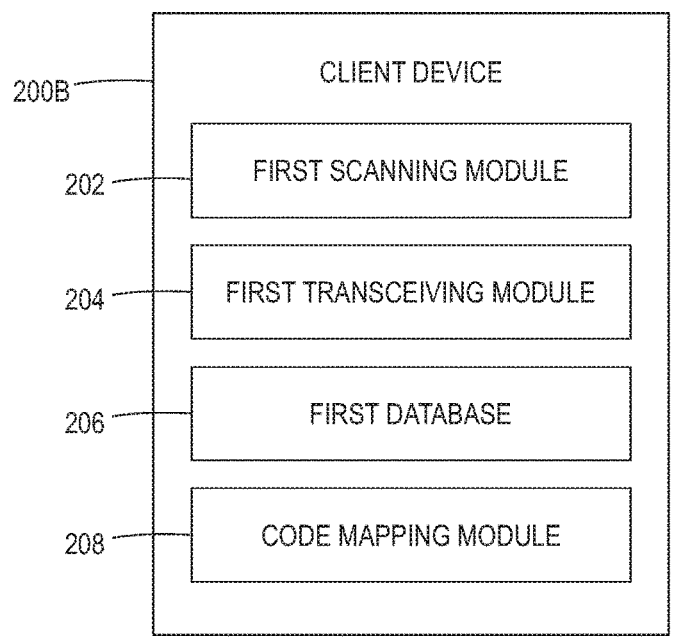
FIG. 2B is a schematic that illustrates system elements of a client device, in accordance with another embodiment of the present disclosure.

FIGS. 2A-2B are schematics that illustrate system elements of a client device 200A and a client device 200B, respectively, in accordance with different embodiments of the present disclosure. As shown, the client device 200A includes a first scanning module 202, a first transceiving module 204, and a first database 206. As discussed with reference to FIG. 1, the client device 200A can be any computing device capable of communicating with a server device, such as the server device 106 of the bank 104, by sending various service requests. The bank 104 may issue at least one check to an account holder, such as the account holder 110, having at least one account in the bank 104. The check may include at least one pre-defined machine-readable cypher and at least one pattern. The at least one pre-defined machine-readable cypher can be a representation including at least one of an image, a bar code, a QR code, an alphabet, a numeral, a symbol, or combination of these. The pattern may include a number of characters such as, alphabets, numerals, symbols, and combination thereof. The characters in the pattern may remain regularly spaced by vertical and/or horizontal lines. Further, the pattern may be two dimensional, i.e., the pattern may include two rows and two columns including characters. Further, the client device 200A is associated with the account holder 110 and is registered with the bank 104 using a client ID. The client ID can be a phone number, an IP address, and so forth. Further, the client device 200A is configured to exchange data with the server device 106 over the network 108. In an exemplary scenario, the client device 200A can be a smart phone capable of sending one or more service requests to the server device 106.

The first database 206 is configured to store information about the account holder 110 and the at least one account associated with the account holder 110 in the bank 104. When the account holder 110 wants to issue a check, he/she may scan the check or the at least one pre-defined machine-readable cypher printed on the check. The first scanning module 202 of the client device 200 is configured to scan the at least one check and/or the at least one pre-defined machine-readable cypher that is present on the check. The first transceiving module is configured to send a service request including the scanned at least one pre-defined machine-readable cypher to the server device 106. The first transceiving module is further configured to receive at least one code from the server device 106. The server device 106 may generate and send the at least one code based on an authentication of the service request including the scanned at least one pre-defined machine-readable cypher. The server device 106 stores and maintains the details about the account holder 110, the client device 200A, the pre-defined machine-readable cypher associated with the at least one check issued to the account holder 110, and so forth. The at least one code includes at least one of an alphabet, a numeral, a symbol, and combination of these. The account holder 110 may highlight a portion of the at least one pattern according to the at least one code as received from the server device 106.

Turning now to FIG. 2B, the client device 200B includes a code mapping module 208. In an embodiment, the first database 206 is configured to store one or more codes and at least and string corresponding to each of the one or more codes. The code mapping module is configured to map the at least one code received from the server device 106 to a string of the at least one string stored in the first database 206. The string includes at least one of alphabets, numerals, and symbols. The account holder 110 may highlight the at least one pattern on the check based on the string. Further, the string is usable only once for highlighting the at least one pattern and/or the string may remain valid for a fixed time-period. For example, the string may be valid for use for 30 minutes from the time it is generated.

Now turning back to FIG. 2A, the code mapping module 208 may be configured to generate an encrypted code based on the scanned at least one pre-defined machine-readable cypher. The encrypted code is a unique code which may be generated or selected from pre-stored encrypted codes corresponding to the at least one pre-defined machine-readable cypher from the first database 206. The encrypted code may include alphabets, numerals, symbols, and so forth. In an embodiment, the code mapping module 208 may generate the encrypted code by encrypting the at least one pre-defined machine-readable cypher using one or more suitable encryption procedures. Examples of the encryption procedures may include private key encryption, public key encryption, etc. Further, the first transceiving module 202 may be configured to send the encrypted code to the server device 106. The server device 106 may authenticate the received encrypted code and send at least one code to the client device 200 (200A or 200B). Thereafter, the account holder 110 may highlight the at least one pattern based on the at least one code.

Figure 3:
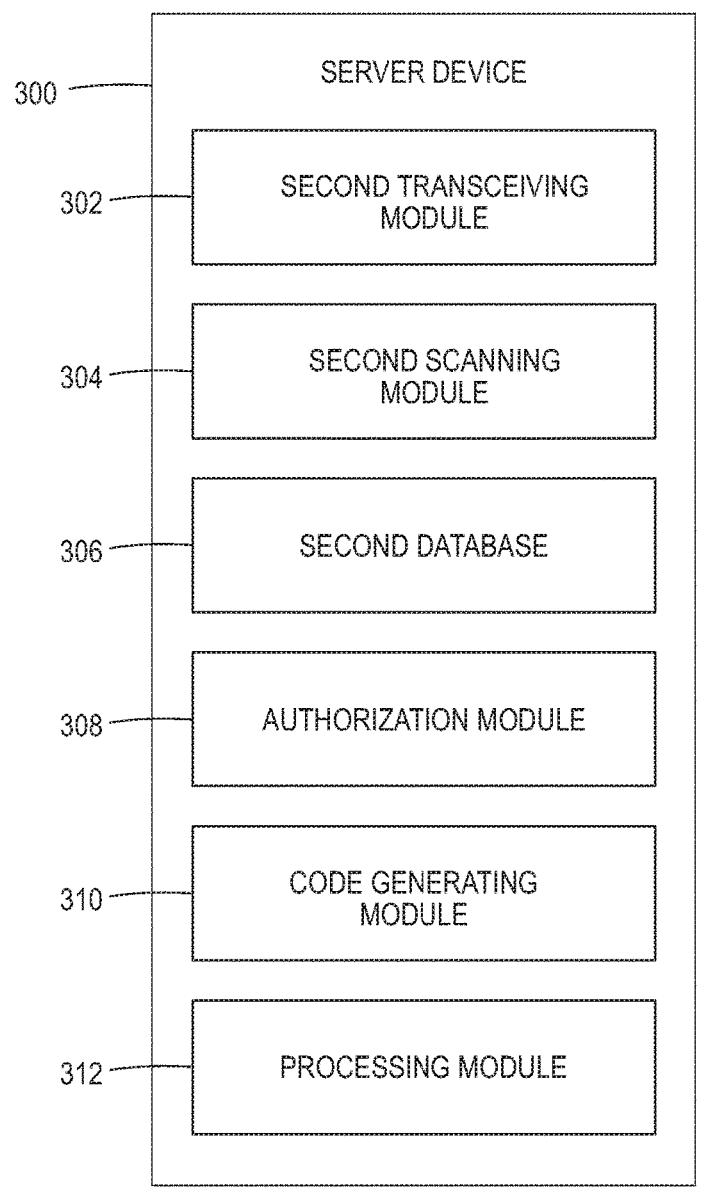
FIG. 3 is a schematic that illustrates system elements of a server device, in accordance with another embodiment of the present disclosure.

FIG. 3 is a schematic illustrating system elements of a server device 300, in accordance with another embodiment of the present disclosure. The server device 300 includes a second transceiving module 302, a second scanning module 304, a second database 306, an authorization module 308, a code generating module 310, and a processing module 312. As discussed with reference to FIG. 1, the server device is similar to the server device 106 and is associated with the bank 104. Further, the server device 300 may be a single device or may be a group of multiple devices such as, computing devices, storage units, desktop computers, and so forth. Further, the server device 106 is capable of communicating with multiple client devices such as the client device 200 and client device 102.

The second database 306 is configured to store and maintain a plurality of pre-defined machine-readable cyphers, a number of codes, a number of strings, a number of client IDs of the client devices registered with the bank 104. The second database 306 is further configured to maintain information about the account holders such as the name, email id, phone numbers, addresses, and so forth, and information about account holders' associated accounts.

The server device 300 is configured to receive the one or more service requests from the client devices (200 and 102) present in the network 108. In an embodiment, the second transceiving module 302 is configured to receive one or more requests from the client devices such as the client device 200. The service request may include scanned at least one pre-defined machine-readable cypher which is printed on at least one check. In an embodiment, the service request(s) includes an encrypted code corresponding to the pre-defined machine-readable cypher. The account holder 110 may use the client device 200 to scan the check and send the service request including the scanned pre-defined machine-readable cypher to the server device 300 when the account holder 110 wishes to issue a check to the user 112.

The authorization module 308 is configured to authorize the service request and the account holder, such as the account holder 110, based on the pre-defined machine-readable cypher and/or the identity of the client device 200 (or 102). For example, the authorization module 308 may compare the pre-defined machine-readable cypher received in the service request and the client ID of the client device 200 from which the service request is received with the pre-stored client ID and pre-defined machine-readable cyphers present in the second database. Based on the comparison the authorization module 308 may authorize the service request and the account holder 110. Further, if the scanned pre-defined machine-readable cypher and/or the client ID do not match with any of the pre-stored pre-defined machine-readable cypher and client IDs, then the authorization module 308 invalidates the service request.

In an embodiment, the second transceiving module 302 receives the service request including the encrypted code corresponding to the scanned pre-defined machine-readable cypher from the client device 200 (or 102). In this scenario, the authorization module 308 authorizes the account holder 110 and the client device 200 based on the encrypted code.

Further, the code generating module 310 is configured to generate and/or assign at least one code based on an authorization of the at least one pre-defined machine-readable cypher or the encrypted code. In some embodiments, the code generating module 310 assigns the at least one code by generating the at least one code in real-time. In alternate embodiments, the code generating module 310 selects the at least one code from the plurality of one time codes stored in the second database 306 and assigns to the client device 200. The second transceiving module 302 is further configured to send the at least one code to the client device 200 (or 102).

At the client device 200, the first transceiving module 204 receives the at least one code. In some embodiments, the account holder 110 is capable of highlighting the at least one pattern on the check using the received at least one code. In alternate embodiments, the account holder 110 is provided with a card including one or more codes of the plurality of codes and at least one string of the plurality of strings stored in the second database for each of the one or more codes. The bank 104 may provide the card to the account holder 110. The account holder 110 may manually map the at least one code to a string in the card. The string may include alphabets, numerals, symbols or combination of these. The account holder 110 then may highlight the at least one pattern on the check based on the string.

Turning now to FIG. 2B, the first database 206 of the client device 200 may store the card including the one or more codes and at least one string of the plurality of strings for each of the one or more codes. In this embodiment, the code mapping module 208 of the client device 200B maps the received at least one code to the at least one string and accordingly the account holder 110 may highlight the at least one pattern on the check. The second database 306 may further store a combination of the pre-defined machine-readable cypher(s) and the at least one code(s) (or strings). Thereafter, the account holder 110 may initiate a check transaction by issuing the highlighted check to a third party such as the user 112. The user 112 may deposit the check at the bank 104 or at an associated branch of the bank 104.

When the highlighted check reaches at the bank 104 for further processing, the processing module 312 is configured to extract the at least one code and the at least one cypher from the highlighted check by scanning the highlighted check. The second scanning module 302 scans the highlighted check and or the at least one pattern and the at least one pre-defined machine-readable cypher printed/present on the check. The processing module 312 may compare the extracted at least one code or the string and the at least one pre-defined machine-readable cypher with the combination of the plurality of codes and the plurality of pre-defined machine-readable cyphers stored in the second database 306. The processing module 312 is further configured to validate the highlighted check based on the comparison. For example, if the pre-defined machine-readable cypher and the at least one code matches with one of the combination of the pre-defined machine-readable cypher and the code stored in the second database 306, then the processing module 312 validates the highlighted check and its associated check transaction. The processing module 312 may validate the highlighted check using one or more standard imaging techniques. Further, the authorization module 308 is configured to authorize the check transaction based on the validation of the highlighted check. In an embodiment, the server device 300 can be an MFD, such as the MFD 114 described in detail in FIG. 4.

Figure 4:
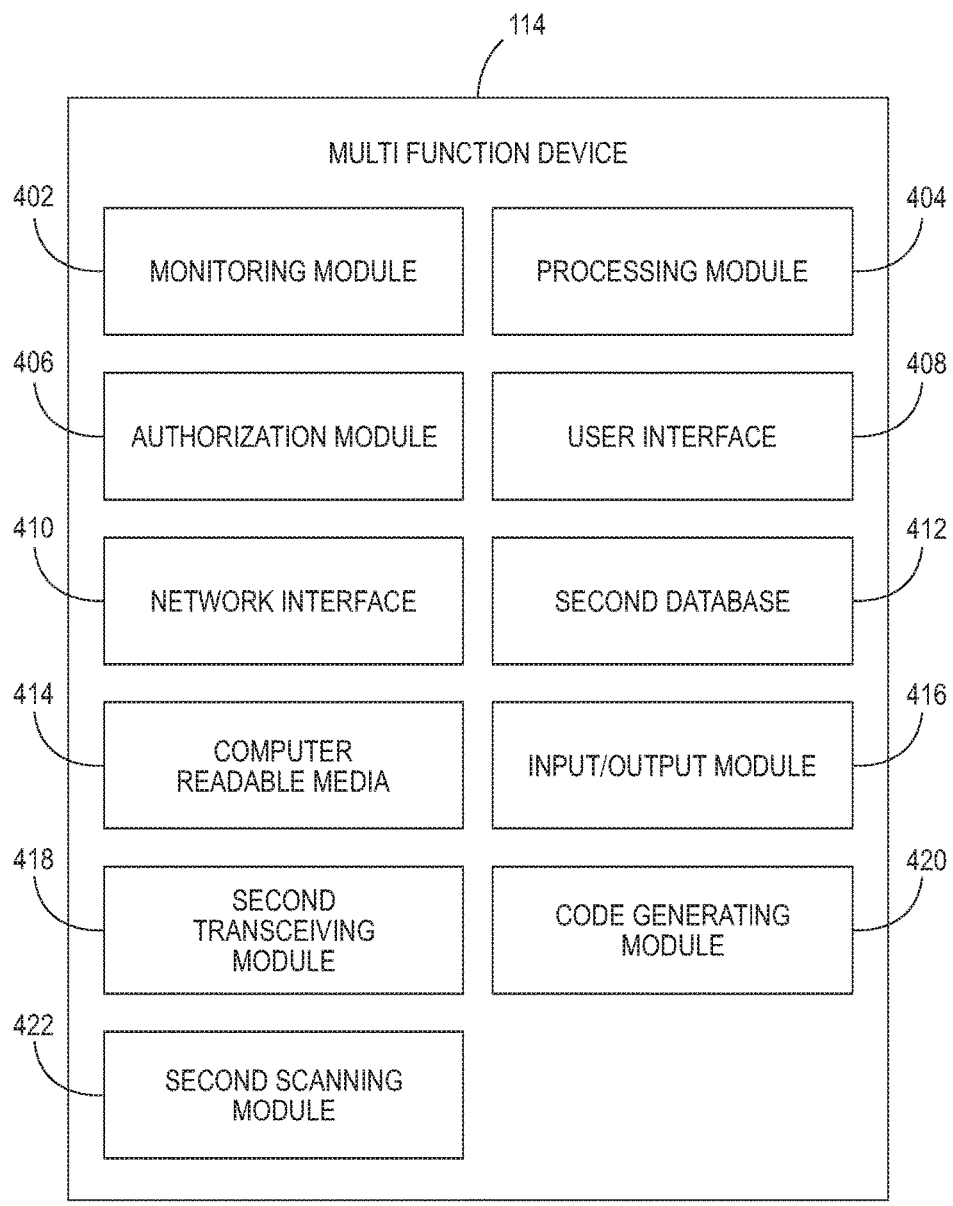
FIG. 4 is a schematic that illustrates system elements of a Multi-Function Device (MFD), in accordance with another embodiment of the present disclosure.

FIG. 4 is a schematic that illustrates system elements of the Multi-Function Device (MFD) 114 of FIG. 1B, in accordance with an embodiment of the present disclosure. As discussed with reference to FIGS. 2A-2B and FIG. 3, a user at the bank 104 can interact with the MFD 114 directly or indirectly for accessing one or more services. The MFD 114 incorporates into a single device a number of traditionally separate functionalities, such as printing, copying, scanning, and faxing. To make these functionalities available to multiple users, the MFD 114 is often incorporated in a computing network, allowing users to communicate directly with the MFD 114. The MFD 114 is configured to perform some or all of functions of the server device 300 (or 106) as described with reference to FIG. 3.

The MFD 114 may perform various functions including communicating with the client device 102 for processing one or more service requests. Further, the MFD 114 is configured to perform various functions, such as printing, scanning, selecting print media and so on; and remotely notifying administrators of certain faults in real time.

The users may interact with the MFD 114 directly or through their mobile communication devices. To be able to perform above mentioned functions, the MFD 114 includes a monitoring module 402, a processing module 404, an authorization module 406, a user interface 408, a network interface 410, a second database 412, a computer readable media 414, and an Input/Output module 416. Each of these system components will be described in detail in the following sections. The network interface 410 allows the MFD 114 to receive and send information from other mobile devices such as the client device 200 and 102 of the account holder 110 and send information to these client devices 200, 102. The network interface 410 also allows the MFD 114 to send and receive information from the other devices such as another server device in the network 108. It is to be appreciated and understood that components of the network interface 410 such as a network card need not reside inside the MFD 114. Some of the components that impart cellular functionality can be configured externally to the MFD 114. The network interface 410 may also include a cellular antenna (not shown) to detect cellular signals and transmit information when required. It will be understood that because the MFD 114 is connected to the network interface 410 it may be moved anywhere in the world.

The input/output (10) module 416 may receive video or text files including instructions from a service center, software updates, or new software to handle certain troubleshooting information or from the user. For example, the service center may send information as data packets using 3G connectivity, such as Short Message Services, and so on. The monitoring module 402 monitors the status of the MFD 114 and further assists in remote management and processing of the service requests. For example, the monitoring module 402 is configured to monitor multiple MFD parameters, such as usage, toner availability, performance, paper jam, MFD operation mode, job requests, and cartridges. In some instances, the monitoring module 402 may monitor these parameters proactively and in other instances, it may monitor specific parameters based on requests received from the user.

Moreover, the monitored values may be directly provided to the processing module 404 (in case of a request, or a proactive action) or continuously, periodically, or at predetermined times compared with threshold parameter values stored in the second database 412. In case of proactive monitoring, the monitoring period and recurrence may depend on the parameter values themselves. For example, toner ink levels may be monitored once a week if the ink level is above 50%, and monitored once a day when the ink level falls below 25%. If the monitored parameter value exceeds or falls below the threshold values (as is the case), the monitoring module 402 may raise a flag and provide the information to the processing module 404. The second database 412 may store multiple threshold values for these parameters. For example, for number of imaging media present in a printing tray, one threshold may be set at 100 pages, another at 50 pages, and a third at 20 pages.

The second database 412 may also store and maintain a plurality of pre-defined machine-readable cyphers, a number of codes, a number of strings, and a number of client IDs of the client devices registered with the bank 104. The second database 306 is further configured to maintain information about the account holders such as the name, email id, phone numbers, addresses, and so forth, and information about account holders' associated accounts.

The MFD 114 further includes a second transceiving module 418 configured to receive one or more service requests from the client devices such as the client device 200. The service request may include scanned at least one pre-defined machine-readable cypher which is printed on at least one check. In an embodiment, the service request(s) includes an encrypted code corresponding to the pre-defined machine-readable cypher. As discussed with reference to FIGS. 2A-2B, the account holder 110 may use the client device 200 to scan the check and send the service request including the scanned pre-defined machine-readable cypher to the server device 300 when the account holder 110 wishes to issue a check to the user 112.

The processing module 404 may receive information from the monitoring module 402 and provide processed information to the user interface 408, the network interface 410 and to the second database 412. To this end, the processing module 404 converts the received information into user readable format (in case the information is provided to a user) and database or module readable format (in case information is received from a user). Further, the user may interact with the MFD 114 through the user interface 408. In an embodiment, the user interface 408 can be a graphical user interface (GUI).

In case the processing module 404 receives monitored parameter values from the monitoring module 402, it may transmit process the parameter values and convert them into a messaging format and transmit them according to one or more delivery rules. These rules may be preconfigured and reconfigurable for each monitored parameter. Rules may include members in sending lists, message mode, etc. For example, for a particular MFD, messaging lists may be set up such that IT experts are alerted in case of paper jams and housekeeping or administrators are informed when paper levels are low. Moreover, the mode of delivery may also be configured. For instance, the processing module 404 may send SMS alerts to IT experts; generate an audible alert for paper levels; or dial an administrator in case of paper jams.

The authorization module 406 regulates access to the MFD 114 based on predetermined user IDs, access codes or preconfigured telephone numbers. For example, each cell phone number of the user or the user may have an associated access code, or unique identity (ID) known only to the user. Thus, along with the print command, users may also be prompted to enter an access code or ID for authenticating the user prior to providing access to the MFD 114. If the access code matches the telephone number, the command may be executed. If not, then the authorization module 406 may send an alert to the administrator, to an alternate phone number, or to an email address associated with a user. For these functions, the database 412 stores profiles of users that includes user information, access codes, telephone numbers, unique IDs, names, preferred printing configurations, preferred paper quality, etc. When a command is received, the unique ID of the user is compared with the existing unique IDs stored in the second database 412. If the numbers match, the corresponding user information is transferred to the processing module 404 along with the command. The authorization module 406 authorizes the user based on this matching.

The authorization module 406 is also configured to authorize the received service request and the account holder, such as the account holder 110, based on the pre-defined machine-readable cypher and/or the identity of the client device 200 (or 102). For example, the authorization module 406 may compare the pre-defined machine-readable cypher received in the service request and the client ID of the client device 200 from which the service request is received with the pre-stored client ID and pre-defined machine-readable cyphers present in the second database. Based on the comparison the authorization module 406 may authorize the service request and the account holder 110. Further, if the scanned pre-defined machine-readable cypher and/or the client ID do not match with any of the pre-stored pre-defined machine-readable cypher and client IDs, then the authorization module invalidated the service request.

In an embodiment, the second transceiving module 418 receives the service request including the encrypted code corresponding to the scanned pre-defined machine-readable cypher from the client device 200 (or 102). In this scenario, the authorization module 406 authorizes the account holder 110 and the client device 200 based on the encrypted code.

Further, the MFD includes a code generating module 420 configured to generate and/or assign at least one code based on an authorization of the at least one pre-defined machine-readable cypher or the encrypted code. In some embodiments, the code generating module 420 assigns the at least one code by generating the at least one code in real-time. In alternate embodiments, the code generating module 420 selects the at least one code from the plurality of one time codes stored in the second database 412 and assigns to the client device 200. The second transceiving module 418 is further configured to send the at least one code to the client device 200 (or 102).

At the client device 200, the first transceiving module 204 receives the at least one code. In some embodiments, the account holder 110 is capable of highlighting the at least one pattern on the check using the received at least one code. In alternate embodiments, the account holder 110 is provided with a card including one or more codes of the plurality of codes and at least one string of the plurality of strings stored in the second database for each of the one or more codes. The bank 104 may provide the card to the account holder 110. The account holder 110 may manually map the at least one code to a string in the card. The string may include alphabets, numerals, symbols or combination of these. The account holder 110 then may highlight the at least one pattern on the check based on the string.

Turning now to FIG. 2B, the first database 206 of the client device 200 may store the card including the one or more codes and at least one string of the plurality of strings for each of the one or more codes. In this embodiment, the code mapping module 208 of the client device 200B maps the received at least one code to the at least one string and accordingly the account holder 110 may highlight the at least one pattern on the check. The second database 412 may further store a combination of the pre-defined machine-readable cypher(s) and the at least one code(s) (or strings). Thereafter, the account holder 110 may initiate a check transaction by issuing the highlighted check to a third party such as the user 112. The user 112 may deposit the check at the bank 104 or at an associated branch of the bank 104.

When the highlighted check reaches at the bank 104 for further processing, the processing module 404 of the MFD 114 extracts the at least one code and the at least one cypher from the highlighted check by scanning the highlighted check. A second scanning module 422 scans the highlighted check and or the at least one pattern and the at least one pre-defined machine-readable cypher printed/present on the check at the MFD 114.

In an embodiment, a bank employee may keep the highlighted check on a platen of the MFD 114 for processing. The processing module 404 may compare the extracted at least one code or the string and the at least one pre-defined machine-readable cypher with the combination of the plurality of codes and the plurality of pre-defined machine-readable cyphers stored in the second database 412. The processing module 404 is further configured to validate the highlighted check based on the comparison. For example, if the pre-defined machine-readable cypher and the at least one code matches with one of the combination of the pre-defined machine-readable cypher and the code stored in the second database 306, then the processing module 404 validates the highlighted check and its associated check transaction. The processing module 404 may validate the highlighted check using one or more standard imaging techniques.

Further, the authorization module 406 is configured to authorize the check transaction based on the validation of the highlighted check. Furthermore, the user interface 408 receives data from the monitoring module 402, the processing module 404, the authorization module 406, and the databases. The user interface 408 includes multiple modes of communication, for example, it may be a simple display, an interactive touch screen display, an audio system, a combination of a display and audio system. Further, the user interface 408 may include and provide one or more options to the user, for example, for selecting a type of service, printing, and so forth. The user interface 408 may impart interactive capabilities to the display device of the MFD 114, allowing users to provide information through a keypad, a touchpad, or simple operation buttons on the MFD body.

The illustrated MFD 114 can, and typically does include a module that provides a runtime environment in which applications or applets can run or execute. The runtime environment can facilitate the extensibility of the MFD 114 by allowing various interfaces to be defined that, in turn, allow applications or applets to interact with the MFD 114.

Figure 5:
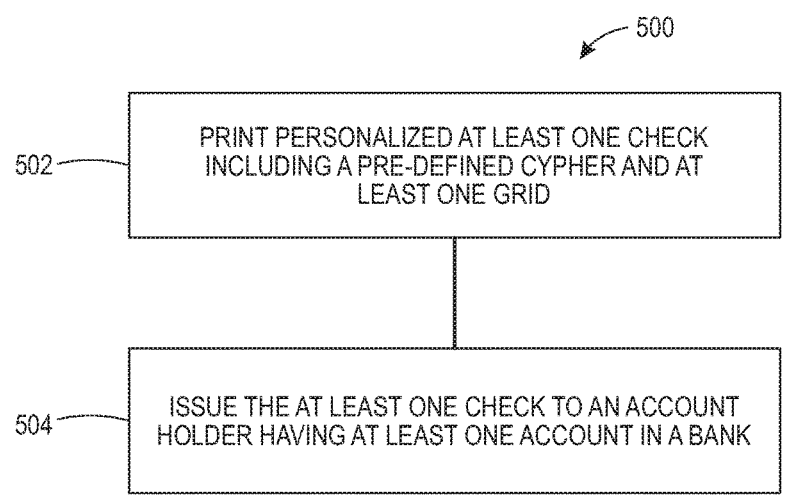
FIG. 5 is a flowchart illustrating a method for issuing a check book to an account holder by a bank, in accordance with an embodiment of the present disclosure.

FIG. 5 is a flowchart illustrating a method 500 for issuing a checkbook to an account holder, such as the account holder 110, by a bank, such as the bank 104, in accordance with an embodiment of the present disclosure. As discussed with reference to FIG. 1, the account holder 110 has at least one account in the bank 104. The bank 104 is configured to provide virtual or physical space in form of different types of accounts to its account holders such as the account holder 110.

At step 502, the bank 104 prints at least one personalized check including a pre-defined machine-readable cypher and at least one pattern. In an embodiment, the bank 104 prints a checkbook including the at least one check. The pre-defined machine-readable cypher is a representation including an image, a bar code, an alphabet, a numeral, a QR code, a symbol, or combination of these. The pattern may include a number of characters such as, alphabets, numerals, symbols, and combination thereof. The characters in the pattern may remain regularly spaced by vertical and/or horizontal lines. Further, the pattern may be two dimensional i.e. the pattern may include two rows and two columns including characters. The at least one pattern is also machine-readable. In an embodiment, the MFD 114 may print the at least one check.

At step 504, the at least one check or the checkbook is issued to an account holder such as the account holder 110 having at least one account in the bank 104.

Figure 6A:
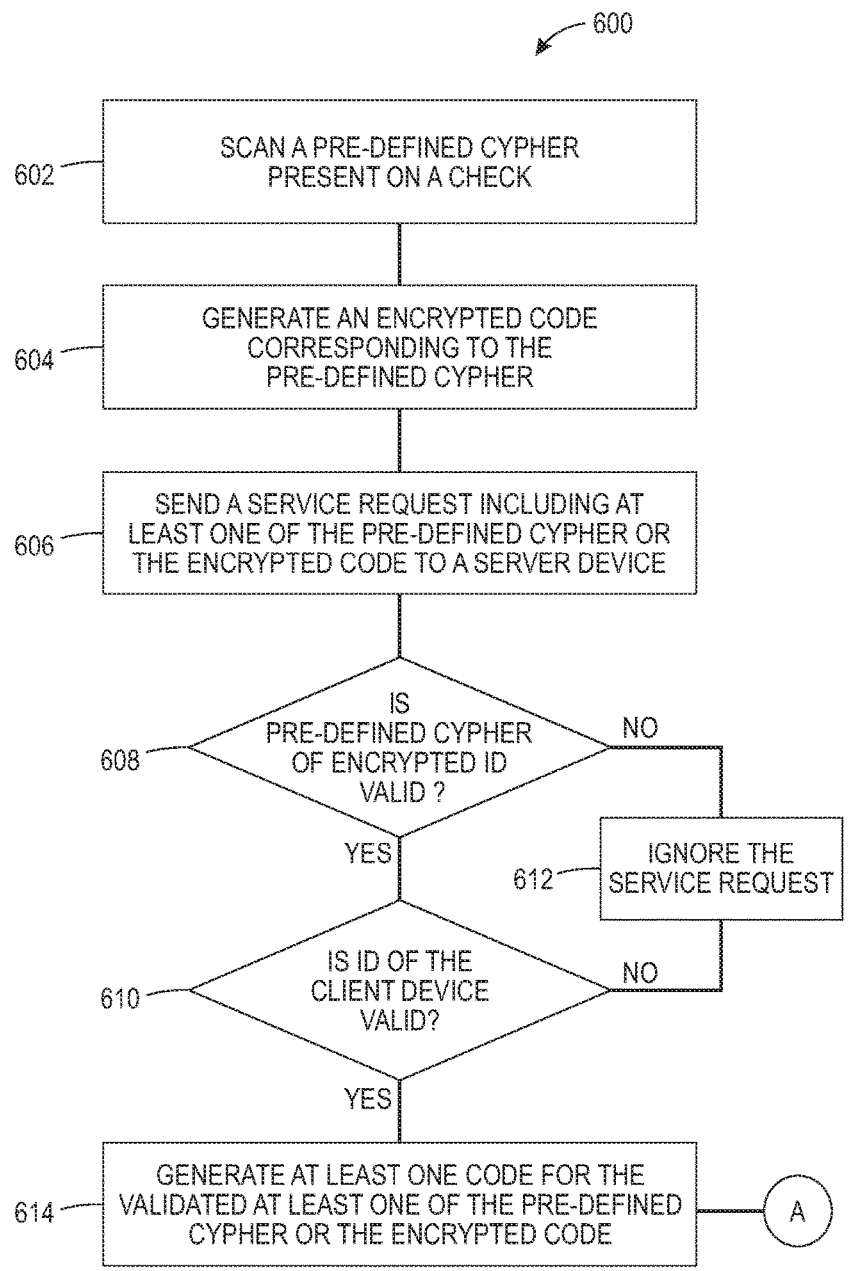
FIGS. 6A-6B are flowcharts illustrating a method for processing a check, in accordance with an embodiment of the present disclosure.
Figure 6B:
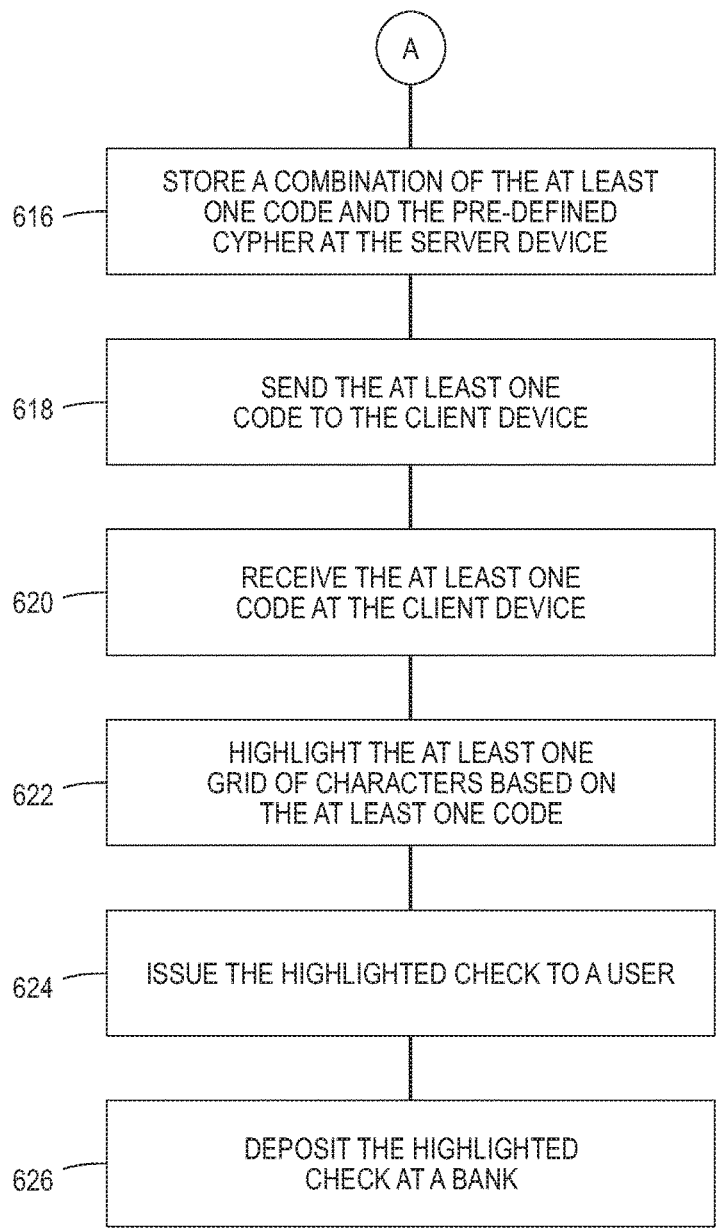

FIGS. 6A-6B illustrates a method 600 for processing a check, in accordance with an embodiment of the present disclosure. As discussed with reference to FIGS. 1, 2A, 2B, and 3 the client device 102 (or 200) and the server device 106 (or 300) of the bank 104 are capable of communicating with each other via the network 108. Hereinafter, the client device 102 and the client device 200 may be used interchangeably. Further, the server device 300 and the server device 106 may be used interchangeably. The client device 102 is configured to send various service requests to the server device 106. The account holder has at least one account in the bank 104. The bank 104 may issue at least one check or a checkbook including multiple checks to the account holder 110. The at least one check may include at least one pre-defined machine-readable cypher and at least one pattern. The pattern may include a number of characters such as, alphabets, numerals, symbols, and combination thereof spaced apart by vertical and/or horizontal lines. When the account holder 110 wishes to issue a check to a third, such as the user 112, the account holder 110 uses the client device 102 to scan the check or the pre-defined machine-readable cypher present in the check at step 602. The pre-defined machine-readable cypher is a unique machine-readable code including alphabets, numerals, symbols, and combination of these. The first scanning module 202 may scan the check. In an embodiment, the client device 102 is a smart phone of the account holder 110, and is registered with the bank 104 using a client ID such as, the phone number. At step 604, the code mapping module 208 may generate an encrypted code corresponding to the at least one pre-defined machine-readable cypher. In some embodiments, the encrypted code is generated using any suitable encryption methods. In alternate embodiments, the encrypted code is selected from a number of encrypted codes stored in the first database 206. At step 606, a service request is sent to the server device 300 (or 106). The first transceiving module 204 may send the service request to the server device 300. In an embodiment, the service request includes the at least one pre-defined machine-readable cypher. In another embodiment, the service request includes the encrypted code.

The service request may be received by the second transceiving module 302 at the server device 300 (or 106). Then at step 608, the authorization module 308 of the server device 300 checks if the at least one pre-defined machine-readable cypher or the encrypted code is valid or not. If the at least one pre-defined machine-readable cypher or the encrypted code is valid then step 610 is followed else, step 612 is executed. At step 610, the authorization module 308 checks if the client ID is of the client device 200 (or 102) is valid by comparing it with pre-stored client IDs in the second database 306. If yes, then step 614 is executed else, step 612 is executed. At step 612, the service request is ignored. Further, the authorization module 308 authorizes the service request and account holder 110 based on the validation of the at least pre-defined machine-readable cypher (or the encrypted code) and/or the client ID of the client device 200 (or 102).

At step 614, the code generating module 310 may generate at least one code/signature for the validated at least one of the pre-defined machine-readable cypher or the encrypted code. The at least one code/signature may include alphabets, numerals, symbols, and combination of these. The code generating module 310 may generate the at least one code/signature in real time or may select the at least one code/signature from the pre-stored codes/signatures stored in the second database 306. At step 616, a combination of the at least one code/signature and the pre-defined machine-readable cypher or the encrypted code is stored in the second database 306. Then, at step 618 the at least one code/signature is sent to the client device 200 (or 102). In an embodiment, the second transceiving module 304 sends the at least one code/signature to the client device 200 (or 102).

At step 620, the first transceiving module 204 may receive the at least one code/signature from the server device 300 (or 106). Then at step 622, the account holder 110 may change an appearance or highlight the at least one pattern on the check based on the at least one code/signature. Further, the at least one code may be usable only once for highlighting the pattern on the check. The at least one code/signature may remain valid for a fixed time, for example for 20 minutes. At step 624, the account holder 110 may initiate a check transaction by issuing the highlighted check to a third party such as the user 112. Then at step 626, the user 112 may deposit the highlighted check at the bank 104 or at an associated branch for processing. A method for processing of the check at the bank 104 is described with reference to FIG. 7.

Figure 7:
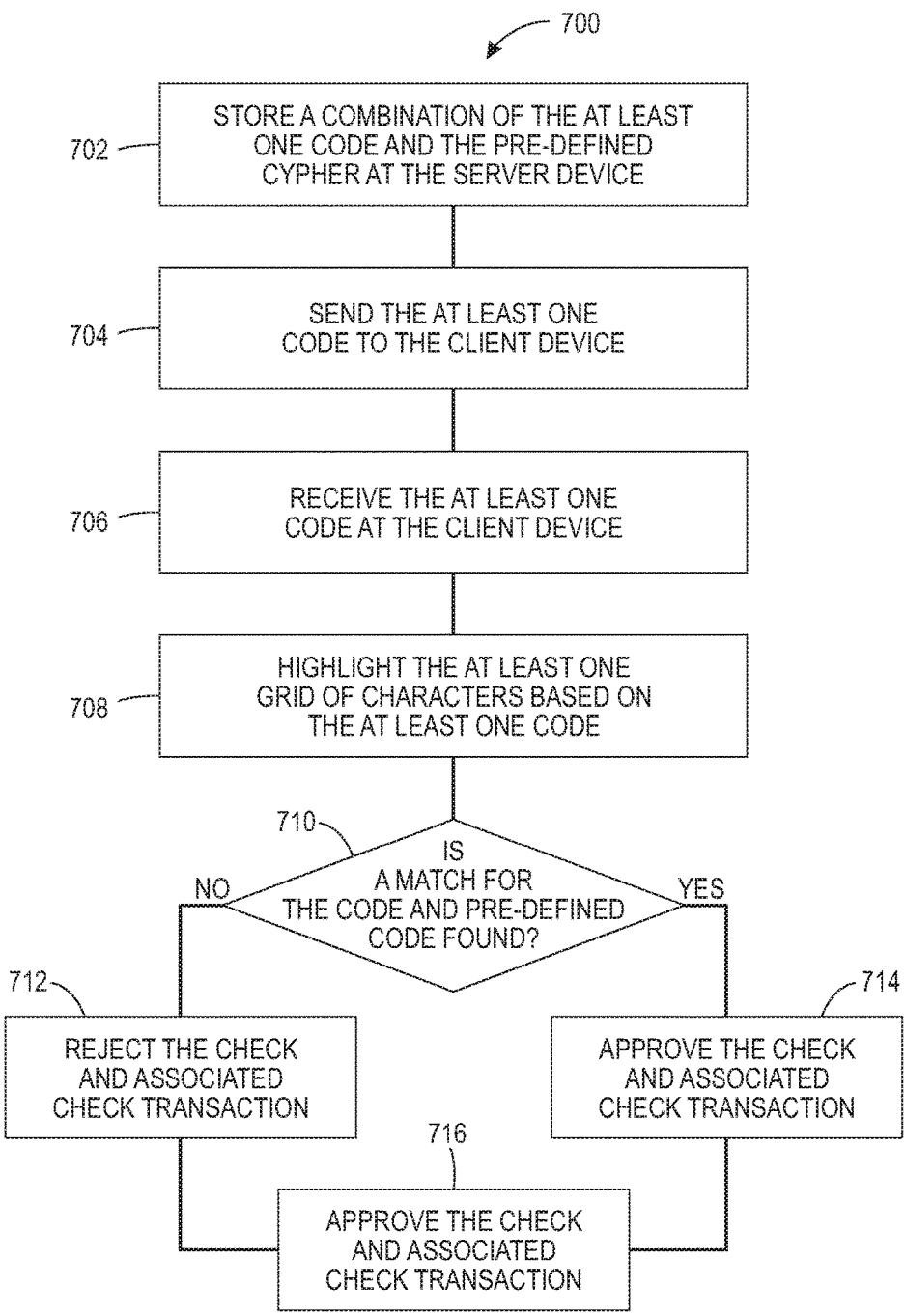
FIG. 7 is a flowchart illustrating a method for processing a highlighted check by the bank, in accordance with an embodiment of the present disclosure.

FIG. 7 is a flowchart illustrating a method 700 for processing the highlighted check by the bank 104, in accordance with an embodiment of the present disclosure. As discussed with reference to FIGS. 6A-6B, the user 112 deposits the highlighted check at the bank 104. At step 702, a highlighted check having a shaded pattern is received at the bank 104 for processing.

The highlighted check is scanned by the second scanning module 302 at step 704. At step 706, information such as at least one code or a string and the pre-defined machine-readable cypher or the encrypted code is extracted from the highlighted check. The processing module 312 may extract the information from the highlighted check. Then at step 708, the extracted information is compared with pre-stored information of the second database 306. The pre-stored information includes plurality of pre-defined machine-readable cyphers, plurality of codes, strings, encrypted codes, combination of these, etc.

At step 710, the processing module 312 checks whether the pre-defined code corresponding to the at least one code match with the pre-stored combination of pre-defined code and the at least one code. If yes, then step 714 is followed else, step 712 is followed. At step 712, the check and the associated check transaction is rejected, while at step 714, the check and the associated check transaction is approved.

Thereafter, at step 716, the account holder is notified about success or failure of the check transaction. For example, when the check is rejected then the account holder is notified that the check transaction has failed. In addition, the account holder is notified that the check transaction is successful if the check is approved.

Figure 8A:
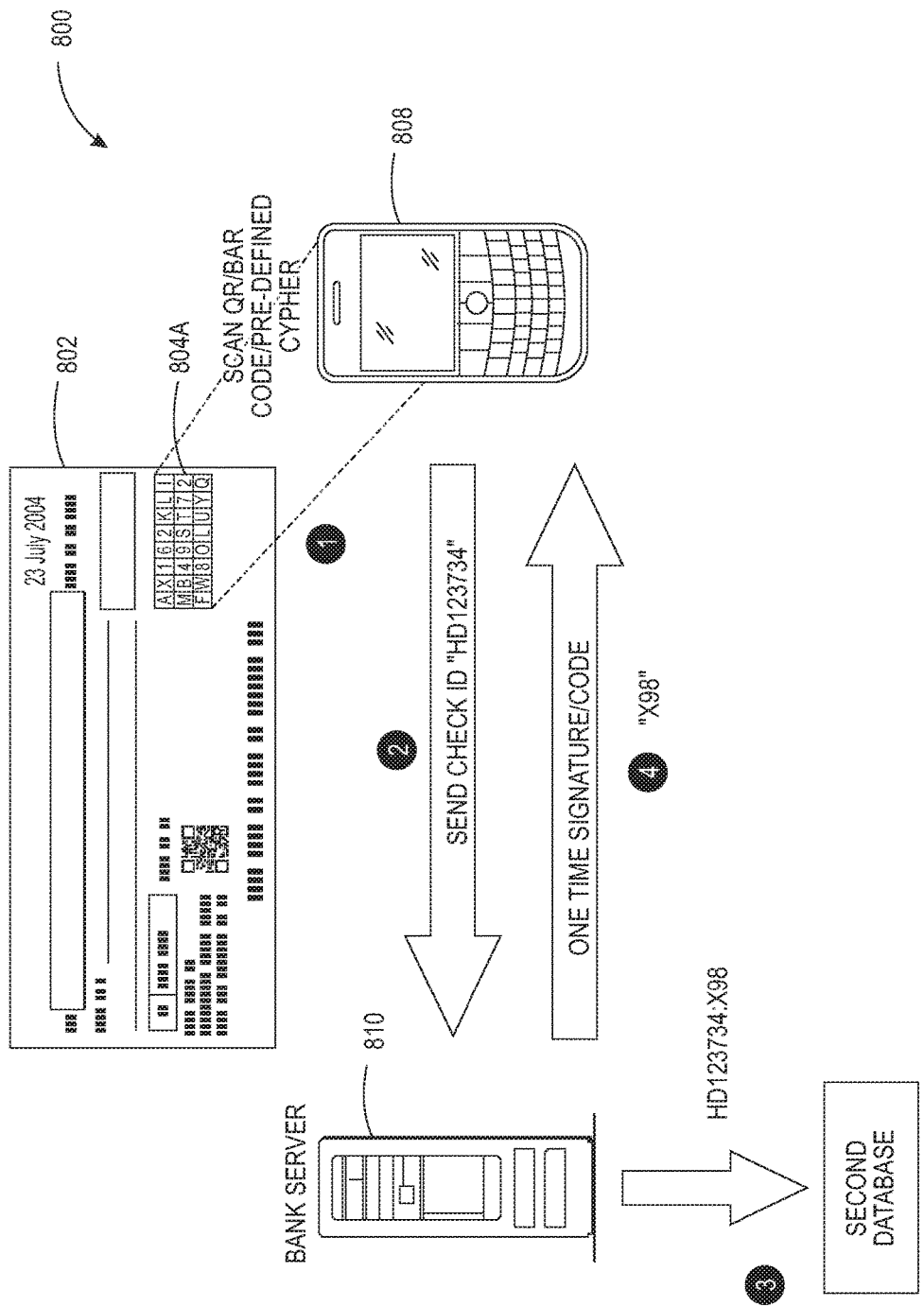
FIGS. 8A-8B illustrate various stages of processing a check for a check based transaction, in accordance with an embodiment of the present disclosure.
Figure 8B:
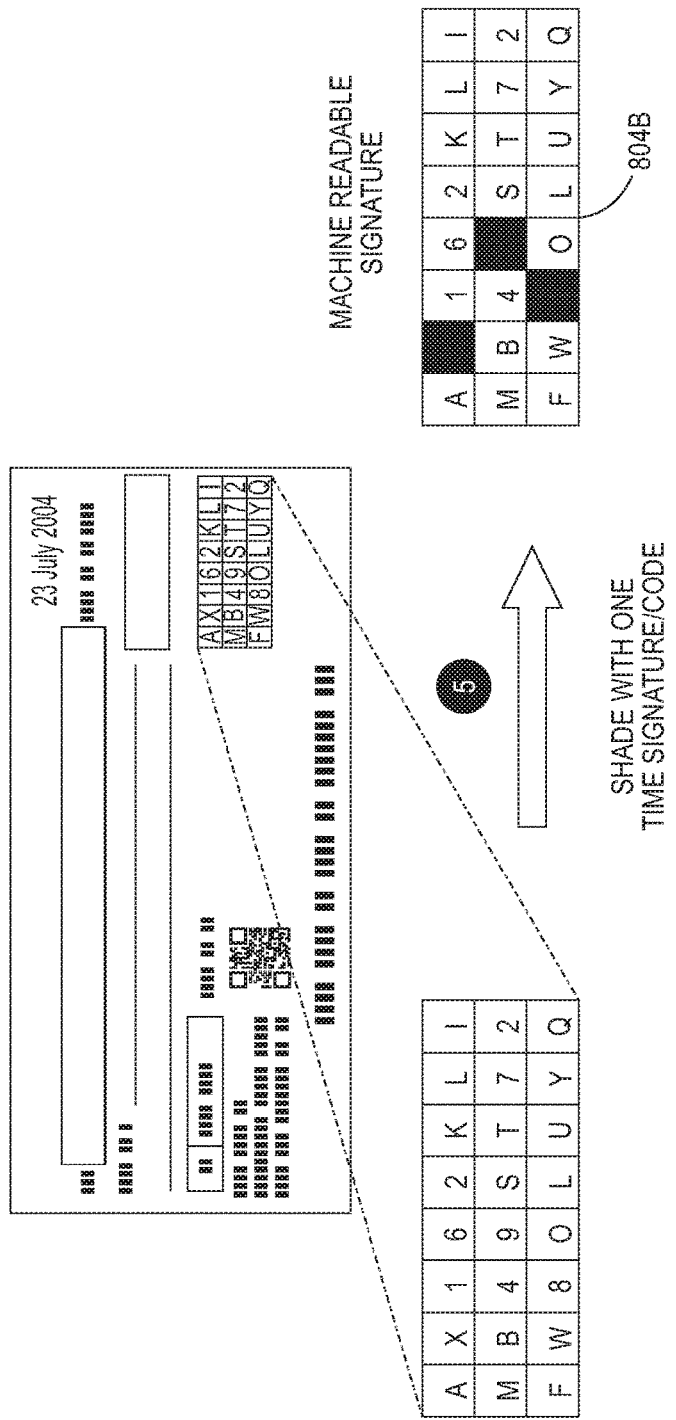

FIGS. 8A-8B illustrate various stages of processing a check for a check-based transaction, in accordance with an embodiment of the present disclosure. As shown, a check 802 includes at least one pre-defined machine-readable cypher 806 and at least one pattern 804A. The pre-defined machine-readable cypher 806 is a representation that may include an image, a bar code, a QR code, and so forth. The check 802 is issued to an account holder by a bank. The account holder has at least one account in the bank.

At stage '1', when the account holder wishes to issue the check 802 to a third party user, then the account holder may scan the pre-defined machine-readable cypher 806 using a client device 808 such as a smart phone 808. The pre-defined machine-readable cypher 806 (or the check ID) is then sent to a bank server device 810 as shown by stage '2'. The bank server device 810 authorizes the account holder, and/or the client device 808 based on the pre-defined machine-readable cypher 806, and an ID associated with the client device 808. Post authorization, the bank server device 810 may generate a one-time signature or code corresponding to the pre-defined machine-readable cypher 806. Then at stage '3', a combination of the pre-defined machine-readable cypher 806 and the one time signature/code is stored in a second database 812 of the bank server device 810. The bank server device 810 then may send a one-time time signature/code to the client device 808 as shown in stage '4'.

Thereafter, the account holder may change the appearance of the pattern 804A by shading the at least one pattern 804A on the check with a one-time signature or code as shown in stage '5'. A pattern 804B is the at least one pattern 804A post highlighting/shading.

The functionalities and the transaction models described above can be applied in the context of banking. However, some embodiments can be applied in other contexts, such as in any context involving the verification or authentication of any document or thing.

The above disclosures are merely provided for exemplary purposes. Changes may be made in details, particularly in matters of shape, size, and arrangement of steps without exceeding the scope of the invention. This may include, to the extent that it is appropriate, the use of any of the features of one example embodiment being used in other embodiments. The invention's scope is, of course, defined in the language in which the appended claims are expressed.

What is claimed is:

1. A method for processing a check that is issued to an account holder by a bank, the method comprising:
   scanning, by a client device, at least one pre-defined machine-readable cypher that is present on the check, the check further defines at least one pattern, wherein the at least one pattern is a two dimensional pattern including a plurality of alphabets, symbols, numerals, and/or a combination thereof;
   sending, by the client device, a service request including the scanned at least one pre-defined machine-readable cypher to a server device;
   receiving, at the client device, at least one code, where the received at least one code is configured to enable the account holder to change the appearance of at least one pattern of the check based on an authentication of the service request including the scanned at least one pre-defined machine-readable cypher from the server device, wherein the at least one code is machine-readable and includes at least one of an alphabet, a numeral, and a symbol;
   changing the appearance, by the account holder, of the at least one pattern on the check based on the received at least one code, wherein changing the appearance of the at least one pattern on the check further comprises manually mapping, by the account holder, the at least one code to a string, the string being at least one of alphabets, numerals, and symbols; and highlighting, by the account holder, the at least one pattern on the check based on the string; and
   processing, by the server device, the highlighted check received at the bank by: extracting the at least one code and the at least one pre-defined machine-readable cypher from the highlighted check by scanning the highlighted check; comparing the extracted at least one code and the at least one pre-defined machine-readable cypher with the plurality of one codes and the plurality of pre-defined machine-readable cyphers stored at the server device; validating the highlighted check based on the comparison; and authorizing the associated check transaction based on the validation of the check.

2. The method of claim 1, wherein the client device registers with the bank using a client identity (ID) associated with the client device and the registered client device is associated with at least one account of the account holder.

3. The method of claim 2, wherein the server device is associated with the bank, and stores and maintains at least one of a plurality of pre-defined machine-readable cyphers, a plurality of codes, a plurality of strings, a plurality of client IDs associated with a plurality of client devices, information about the plurality of account holders, and information about a plurality of accounts.

4. The method of claim 3, wherein the account holder has at least one account in the bank, and the client device stores information about the at least one account and the account holder.

5. The method of claim 4 further comprising:
   receiving, by the server device, the service request including the at least one pre-defined machine-readable cypher from the client device;
   authorizing, by the server device, the service request and the account holder based on at least one of the at least one pre-defined machine-readable cypher and the identity (ID) associated with the client device;
   assigning, by the server device, the at least one code based on the at least one pre-defined machine-readable cypher; and
   sending, by the server device, the at least one code to the client device.

6. The method of claim 5, wherein assigning the at least one one code further comprises generating the at least one code in real-time.

7. The method of claim 6, wherein assigning the at least one code further comprises selecting the at least one code from the plurality of codes stored in the second database.

8. The method of claim 7, wherein the account holder is provided with a card including one or more codes of the plurality of codes and at least one string of the plurality of strings for each of the one or more codes, wherein the card is provided by the bank.

9. The method of claim 1, wherein the account holder is capable of initiating a check transaction by providing the highlighted check to a user, wherein the user deposits the highlighted check at the bank.

10. The method of claim 1, wherein the check is validated automatically by the server device using one or more standard imaging techniques.

11. The method of claim 10, further comprising:
generating, by the client device, an encrypted code based on the at least one pre-defined machine-readable cypher;
sending, by the client device, the a encrypted code to the server device; and
receiving, by the client device, the at least one code based on the encrypted code from the server device.

12. The method of claim 11, wherein the server device is a multi-function device (MFD).

13. A client device for processing a check that is issued to an account holder by a bank, the client device is for use with a server device, the client device comprising:
a first scanning module configured to scan at least one pre-defined machine-readable cypher that is present on the check, the check further defines at least one pattern, wherein the at least one pattern is a two dimensional pattern including a plurality of alphabets, symbols, numerals, and/or a combination thereof; and
a first transceiving module configured to:
send a service request including the scanned at least one pre-defined cypher to the server device; and
receive at least one code, where the received at least one code is configured to enable the account holder to change the appearance of at least one pattern of the check based on an authentication of the service request including the scanned at least one pre-defined cypher from the server device, the at least one code including at least one of an alphabet, a numeral, and a symbol;
wherein the code is configured to enable the account holder to change the appearance of the at least one pattern on the check based on the at least one code received at the first transceiving module, wherein changing the appearance of the at least one pattern on the check further comprises manually mapping, by the account holder, the at least one code to a string, the string being at least one of alphabets, numerals, and symbols; and highlighting, by the account holder, the at least one pattern on the check based on the string; and
process the highlighted check received at the bank by:
extracting the at least one code and the at least one pre-defined machine-readable cypher from the highlighted check by scanning the highlighted check; comparing the extracted at least one code and the at least one pre-defined machine-readable cypher with the plurality of one codes and the plurality of pre-defined machine-readable cyphers stored at the server device; validating the highlighted check based on the comparison; and authorizing the associated check transaction based on the validation of the check.

14. The client device of claim 13, wherein the client device registers with the bank using an identity (ID) associated with the client device and the registered client device is associated with at least one account of the account holder.

15. The client device of claim 14, wherein the server device is associated with the bank.

16. The client device of claim 15, further comprising a first database configured to store information about the account holder and at least one account associated with the account holder in the bank.

17. The client device of claim 16, wherein the server device further comprises:
a second database configured to store and maintain at least one of a plurality of pre-defined machine-readable cyphers, a plurality of codes, a plurality of strings, a plurality of client IDs associated with a plurality of client devices, information about the plurality of account holders, and information about a plurality of accounts;
an authorization module configured to authorize the service request and the account holder based on at least one of the at least one pre-defined machine-readable cypher and the identity (ID) associated with the client device;
a code generating module configured to assign the at least one code based on an authorization of the at least one pre-defined machine-readable cypher, wherein the authentication module authorizes the at least one pre-defined machine-readable cypher; and
a second transceiving module configured to:
receive the service request including the at least one pre-defined machine-readable cypher from the client device; and
send the at least one code to the client device.

18. The client device of claim 17, wherein the code generating module of the server device is further configured to assign the at least one code by generating the at least one code in real-time.

19. The client device of claim 18, wherein the code generating module is further configured to select the at least one code from the plurality of one time codes stored in the second database.

20. The client device of claim 19, wherein the account holder is provided with a card including one or more codes of the plurality of codes and at least one string of the plurality of strings for each of the one or more codes, wherein the card is provided by the bank.

21. The client device of claim 20, wherein the account holder is capable of initiating a check transaction by providing the highlighted check to a user, wherein the user deposits the highlighted check at the bank.

22. The client device of claim 21, wherein the server device further comprises a processing module configured to:
extract the at least one code and the at least one pre-defined machine-readable cypher from the highlighted check by scanning the highlighted check, wherein a second scanning module scans the highlighted check;
compare the extracted at least one code and the at least one pre-defined machine-readable cypher with the plurality of codes and the plurality of pre-defined machine-readable cyphers stored in the second database;
validate the highlighted check based on the comparison, wherein the authorization module authorizes the associated check transaction based on the validation of the highlighted check.

23. The client device of claim 22, wherein the processing module validates the highlighted check using one or more standard imaging techniques.

24. The client device of claim 23, wherein the server device is a multi-function device (MFD).

25. The client device of claim 24, wherein the client device further comprises a code-mapping module configured to generate an encrypted code based on the pre-defined machine-readable cypher.

26. The client device of claim 25, wherein the first transceiving module is configured to send the encrypted code to the server device; and receive the at least one code based on the encrypted code from the server device.

* * * * *